Jan. 27, 1931. A. G. HOLMES 1,790,149
METER
Filed Sept. 4, 1926 2 Sheets-Sheet 1

INVENTOR
Abram G. Holmes
BY Green and McCallister
His ATTORNEYS

Jan. 27, 1931. A. G. HOLMES 1,790,149
METER
Filed Sept. 4, 1926  2 Sheets-Sheet 2

INVENTOR
Abram G. Holmes
BY Green and McCallister
His ATTORNEYS.

Patented Jan. 27, 1931

1,790,149

UNITED STATES PATENT OFFICE

ABRAM G. HOLMES, OF PITTSBURGH, PENNSYLVANIA, ASSIGNOR, BY MESNE ASSIGNMENTS, TO PITTSBURGH EQUITABLE METER COMPANY, OF PITTSBURGH, PENNSYLVANIA, A CORPORATION OF PENNSYLVANIA

METER

Application filed September 4, 1926. Serial No. 133,547.

This invention relates to meters and more particularly to gas meters of the type constructed of cast iron and employing diaphragms which are actuated by the flow of fluid through the meter so as to operate an associated registering mechanism. It has heretofore been customary to so construct meters of this type that the diaphragms were held in place by having their flexible peripheries clamped between the circular faces of the meter body and the engaging faces of cast iron covers which cooperated with the associated diaphragms in enclosing the outer measuring chambers of the meter. One of the disadvantages resulting from this construction is occasioned by the fact that the material of which the flexible portions of the diaphragms are constructed is so porous as to permit seepage of distillate and gas through the joint between the cast meter body and the cover, in which joint the diaphragms act as gaskets.

An object of this invention is to provide a meter of the type set forth of such construction and arrangement that no seepage of distillate or gas can take place through the joints between the meter proper and the covers.

A further object is to provide a meter of the type set forth of such construction so as to eliminate the use of the diaphragm as gaskets between the meter proper and the covers.

A still further object is to provide a diaphragm holder of such construction and arrangement that it can be applied to the well known cast iron meters now in use so as to eliminate the presence of the diaphragms as gaskets in the cover joints.

A still further object is to provide a meter of simple and rugger construction which will be easy to manufacture and assemble and dependably accurate in operation.

Figure 1:
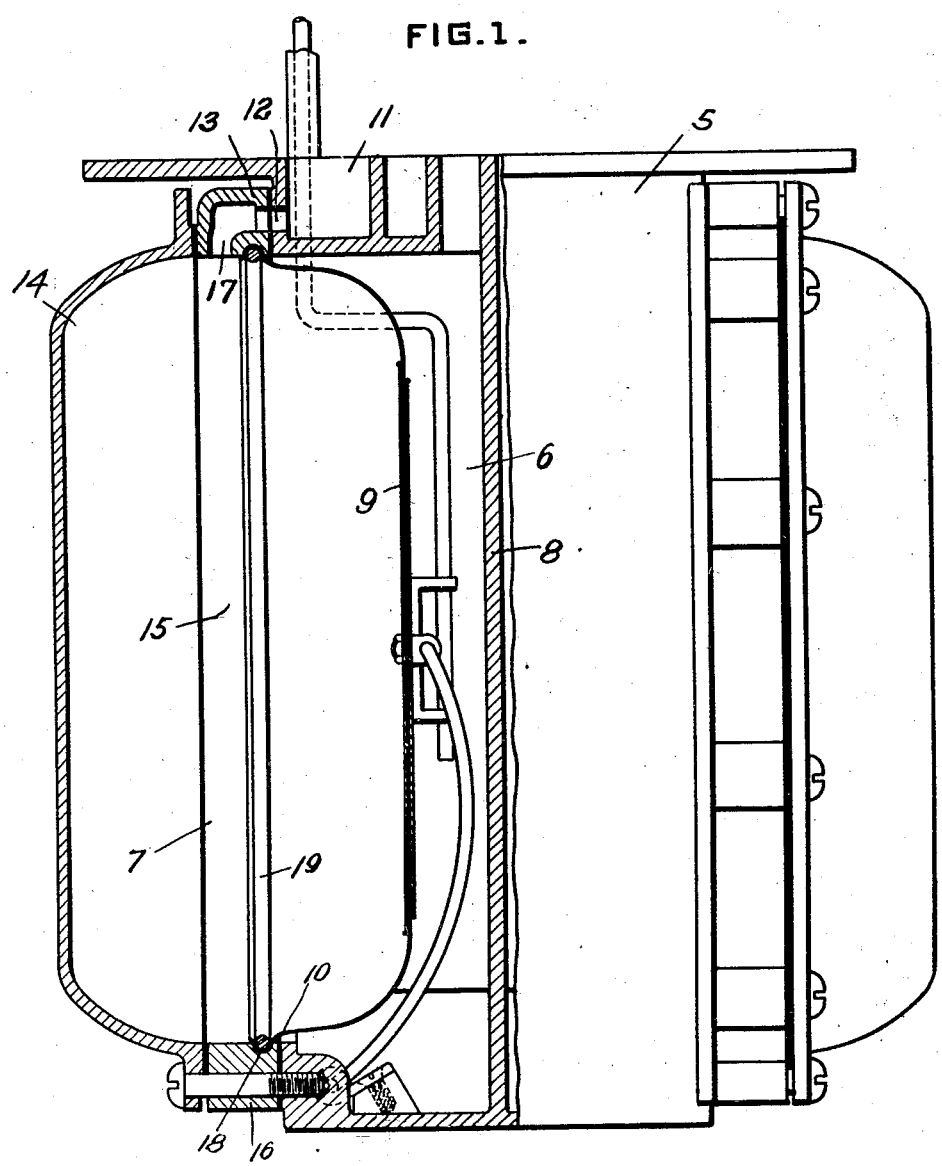
Figure 2:
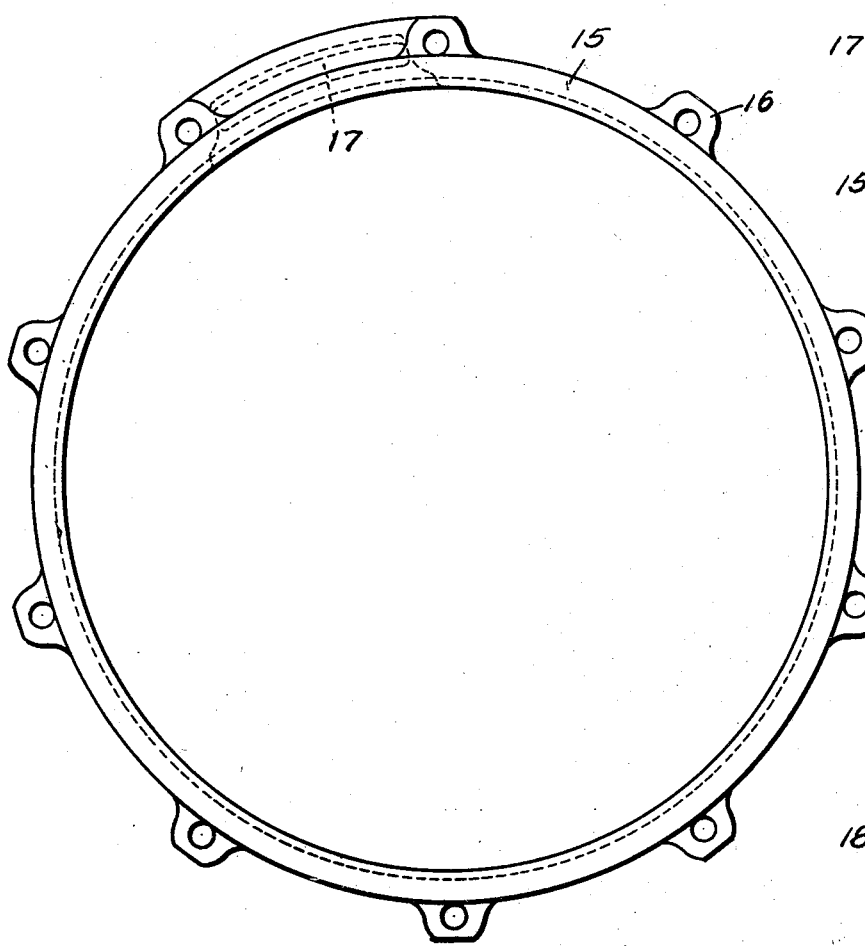
Figure 3:
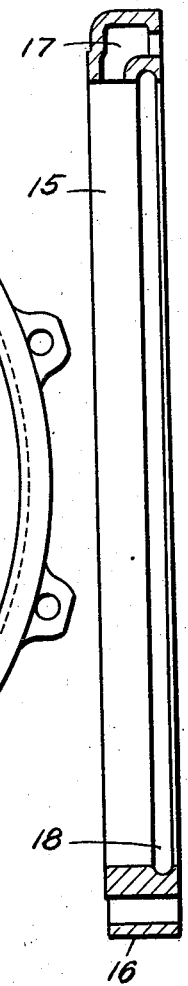

These and other objects which will be apparent to those skilled in this particular art are accomplished by means of the invention illustrated in the accompanying drawings, in which Figure 1 is a side elevation of a portion of the meter constructed in accordance with one embodiment of this invention, showing one-half of the meter in section. Fig. 2 is a view in elevation of an improved form of diaphragm holder and Fig. 3 is a transverse section thereof.

The particular embodiment of this invention which has been chosen for the purpose of illustration includes a meter having a cast iron body portion of standard construction which is provided with gas ports in the annular faces thereof communicating with passages through which the gas flows between a distributing chamber (not shown) and the outer measuring chambers located between the movable diaphragms and the associated covers. The present invention contemplates the provision of devices for supporting the diaphragm peripheries in such a way as to eliminate the necessity of clamping the diaphragms between the covers and the meter faces as has hitherto been done with this form of meter. As illustrated, this mechanism consists of a diaphragm holder in the form of an annular ring adapted to be clamped in position between each meter face and its associated cover. Each ring is provided with a passageway adapted to communicate with the gas port in the cooperating meter face for connecting such port with the adjacent outer measuring chamber located between the associated cover and diaphragm. The annular ring constitutes a diaphragm holder for supporting the periphery of the diaphragm in operative position.

As illustrated, the present invention is shown in connection with a cast iron meter 5 of standard construction having an inner measuring chamber 6 and an outer measuring chamber 7 on each side of a central partition 8. A movable diaphragm 9 having a flexible leather periphery 10 separates the inner and outer measuring chambers on each side of the meter. A gas passage 11 connects the distributing chamber (not shown) with ports 12 formed in each face 13 of the meter and adapted to communicate with the associated outer measuring chamber, all as is well known in this particular art.

In order to eliminate the necessity of clamping the diaphragm periphery between the cover 14 and the face 13 of the meter, I employ a separate diaphragm holder which is preferably constructed so as to provide a passageway between the gas port 12 in the associated face of the meter and the measuring chamber 7 in addition to constituting a means for holding the diaphragm.

As illustrated, this holder is in the form of an annular or ring shaped member 15 having perforated lugs 16 by means of which it may be clamped in position between the meter face and associated cover. The annular member 15 is of such diameter that the inner surface thereof, that is, the surface having a groove 18 therein, is substantially flush with the inner surface of the meter body 5 and cover 14. That portion of the holder adjacent the gas port 12 is provided with an elongated arc shaped gas passage 17 which cooperates with the passage 11 and port 12 to form a gas passage between the distributing chamber and the measuring chamber. The passage 17 is of substantially arc shape so as to accommodate different relative positions of the port 12 in different castings, and has an angularly disposed portion for communication with measuring chamber 7, as seen in Figure 1.

A diaphragm receiving groove 18 is formed around the inner surface of the holder and the flexible periphery 10 of the diaphragm is clamped in the groove by means of a metal snap ring 19 which presses the diaphragm periphery into gas tight engagement therewith.

It will be apparent that the present invention permits the use of such gaskets between the cover and the holder and between the holder and the meter face as will ensure fluid tight joints through which neither gas nor distillate can seep. It will also be apparent that the present invention eliminates the necessity of forming covers with gas passages for communicating with the ports in the meter faces as is essential in the usual form of meter where the diaphragms are clamped between the covers and these faces. The fact that the diaphragm is not clamped against the meter face also eliminates the necessity of forming a port in the diaphragm in line with the port 12 in the meter, thus eliminating the possibility of the diaphragm partially closing the port 12 and reducing the area of the gas passage.

Although I have described a specific form of diaphragm holder it will be apparent to those skilled in the art that various changes, substitutions, additions and omissions may be made therein without departing from the spirit of the invention or the scope of the appended claims.

What I claim as new and desire to secure by Letters Patent is:

1. A gas meter having in combination a body portion including a chamber open at one end, a cover, a diaphragm holder fitting over said opening and clamped between said cover and the body portion of said casing, the inner edge of said holder terminating substantially flush with the inner wall of the gas receiving chamber and forming a continuation of said wall, a diaphragm dividing said chamber into inner and outer measuring chambers and means for securing said diaphragm to said edge of the holder.

2. A gas meter having in combination a body portion including a chamber open at one end and provided with a gas port in the face thereof, a cover fitting over said opening, a diaphragm holder clamped between said cover and the body portion of said casing and provided with a gas port cooperating with said first mentioned gas port, the inner edge of said holder terminating substantially adjacent to the inner wall of the gas receiving chamber and forming a continuation of said wall, a diaphragm dividing said chamber into inner and outer measuring chambers and means for securing said diaphragm to said edge of the holder, said gas port terminating in said outer measuring chamber.

3. A gas meter having in combination a body portion including a chamber open at one end, a cover fitting over said opening, a diaphragm holder clamped between said cover and the body portion of said casing and having an opening therein registering substantially with said chamber, a diaphragm dividing said chamber into outer and inner measuring chambers, and means for securing said diaphragm to said holder at a portion thereof that is substantially adjacent to the inner wall of the gas receiving chamber.

4. A gas meter having in combination a body portion including a chamber opened at one end and provided with a gas port in the face thereof, a cover fitting over said opening, a diaphragm holder of a thickness sufficient to have an angular port formed therein clamped between said cover and the body portion of said casing and provided with an angular gas port cooperating with said first mentioned gas port, a diaphragm and means for securing said diaphragm to said holder in a manner so that its peripheral edge is substantially adjacent to the inner wall of the gas receiving chamber, said gas port terminating in said outer measuring chamber.

5. A gas meter having in combination a body portion including a chamber opened at one end, a cover fitting over said opening, an annular diaphragm holder of substantial thickness clamped between said cover and the body portion of said casing, the inner edge of said holder terminating substantially flush with the inner wall of the gas receiving chamber, a diaphragm dividing said chamber into inner and outer measuring chambers, and clamping means for securing said diaphragm to said edge of the holder.

In testimony whereof, I have hereunto subscribed my name this 30th day of August, 1926.

ABRAM G. HOLMES.